US012717723B1

(12) United States Patent
Naik et al.

(10) Patent No.: US 12,717,723 B1
(45) Date of Patent: Aug. 25, 2026

(54) OPTIMIZED FILE SCANNING USING MULTI-TYPE VOLUME ATTACHMENTS AND SEQUENTIAL BLOCK READ PRE-WARMING

(71) Applicant: Amazon Technologies, Inc., Seattle, WA (US)

(72) Inventors: Kunjan Shridhar Naik, Redondo Beach, CA (US); Aravind Santhanam, Redmond, WA (US); Shlomo Yehezkel, West Hills, CA (US); Ashay S. Manjure, Redondo Beach, CA (US)

(73) Assignee: Amazon Technologies, Inc., Seattle, WA (US)

( * ) Notice: Subject to any disclaimer, the term of this patent is extended or adjusted under 35 U.S.C. 154(b) by 369 days.

(21) Appl. No.: 18/473,942

(22) Filed: Sep. 25, 2023

(51) Int. Cl.
*G06F 12/0868* (2016.01)
*G06F 3/06* (2006.01)
*H04L 9/40* (2022.01)

(52) U.S. Cl.
CPC .......... *G06F 12/0868* (2013.01); *G06F 3/061* (2013.01); *G06F 3/0655* (2013.01); *G06F 3/067* (2013.01); *H04L 63/1416* (2013.01); *H04L 63/145* (2013.01)

(58) Field of Classification Search
CPC .... G06F 12/0868; G06F 3/061; G06F 3/0655; G06F 3/067; H04L 63/1416; H04L 63/145
See application file for complete search history.

(56) References Cited

U.S. PATENT DOCUMENTS

2007/0073964 A1* 3/2007 Dawson ................ G06F 3/0665 711/111
2012/0198148 A1* 8/2012 Benhase ............. G06F 12/0866 711/E12.019
2021/0326172 A1* 10/2021 Muthiah ................. G06F 9/542
2022/0345483 A1* 10/2022 Shua ..................... H04L 9/0825
2024/0086328 A1* 3/2024 Vazhkudai ............. G06F 3/061

* cited by examiner

*Primary Examiner* — Michael Krofcheck
(74) *Attorney, Agent, or Firm* — Nicholson DeVos Webster & Elliott LLP

(57) ABSTRACT

Techniques for optimized file scanning using multi-type volume attachments and sequential block read pre-warming are described. A network-based logical storage volume of a first type providing high input-output operations per second (IOPS) is attached to a compute instance. A prewarmer loads the data of the storage volume by making sequential reads, across a network, of the raw data of the volume. After the prewarming, the logical storage volume attachment type is modified to be of a second type providing comparatively fewer IOPS.

20 Claims, 9 Drawing Sheets

OPTIMIZED FILE SCANNING USING MULTI-TYPE VOLUME ATTACHMENTS AND SEQUENTIAL BLOCK READ PRE-WARMING

BACKGROUND

Many companies and other organizations operate computer networks that interconnect numerous computing systems to support their operations. For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies can provide virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

BRIEF DESCRIPTION OF DRAWINGS

Various examples in accordance with the present disclosure will be described with reference to the drawings, in which.

DETAILED DESCRIPTION

Figure 1:
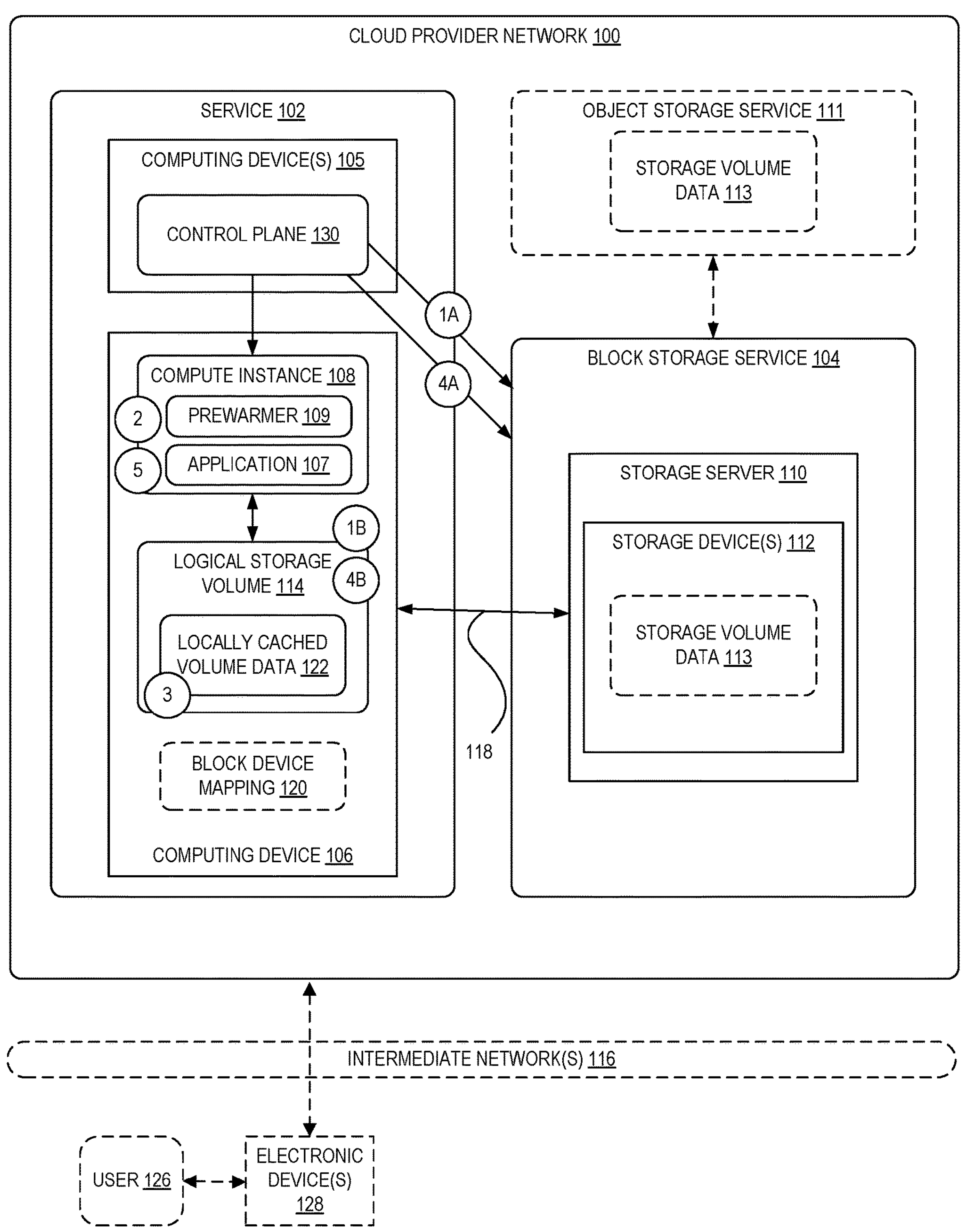
FIG. 1 is a diagram illustrating an environment for optimized file scanning using multi-type volume attachments and sequential block read pre-warming according to some examples.

The present disclosure relates to methods, apparatus, systems, and non-transitory computer-readable storage media for optimized file scanning using multi-type volume attachments and sequential block read pre-warming. According to some examples, data underlying a network-based logical data storage volume is pre-fetched or "pre-warmed," prior to application-level need for the data, using a hybrid volume attachment technique together with a sequential raw disk access approach.

In some examples, the hybrid volume attachment technique utilizes a first type of attachment to the logical data storage volume during the pre-warming phase of operation, and then a second type of attachment to the logical data storage volume thereafter, such as during application execution. The first type of attachment provides comparatively higher performance than second type of attachment, such as a higher amount, baseline, or maximum of input-output operations per second (IOPS), throughput, and/or latency, as provided by the block storage service managing the volume. This higher performance connectivity can be utilized when it is most needed, i.e., during the pre-warming phase of operation when connectivity to the block storage service for obtaining the underlying data is most used. Thereafter, when some or all of the underlying data for the volume has been fetched across the network from the block storage service, the attachment type can be beneficially shifted to a less performant second type, which does not impact the performance of the application (as the network accesses to the block storage service are not needed or rarely needed due to the cached volume data existing in a local memory or storage) and reduces the load or wasted capacity that would otherwise need to be provisioned or reserved by the block storage service in order to provide the "higher" performance attachment.

In various examples, sequential disk access techniques are utilized with hybrid volume attachment techniques to provide even further performance improvements. Instead of issuing requests for volume data on a file-by-file basis, which typically require random—and thus slow—accesses to a variety of underlying storage blocks, examples instead pre-warm the volume by accessing data from the volume using sequential "raw" data reads. In some examples, the pre-warming begins by reading at a point of the volume (e.g., at a "beginning" or offset zero) and issues additional read requests for consecutive or subsequent locations, e.g., by reading a first four kilobytes (KB) of data starting at a first location (e.g., offset zero), followed by a next four KB of data at the next location (e.g., offset zero plus 4 KB), and so on. Moreover, other examples can make use of metadata describing the data stored on the volume to even further optimize the pre-warming, e.g., by focusing on pre-fetching only those portions of the volume that have data, or have a threshold amount of data (e.g., groupings of blocks or sectors having at least a threshold amount of usage), reducing the time needed for the pre-warming and allowing the application to begin its work sooner.

Accordingly, techniques disclosed herein allow applications (such as malware scanning utilities) needing to access various files of a filesystem provided by a network-based logical data storage volume to execute substantially faster by having the underlying data be quickly and efficiently pre-fetched, via sequential accesses and/or highly performant volume attachments, from across the network and thus be resident in a memory or storage that is local to the application. Accordingly, these applications are not bottlenecked by I/O as they do not need to wait for volume data to be fetched from across the network, as some or all of it already exists locally in a much faster storage tier. Moreover, techniques disclosed herein allow the system (e.g., a block storage service) providing the network-attached volumes to regain resource capacity, as applications that would otherwise utilize the "higher" performant attachment types for the entirety of their execution (requiring additional capacity dedication or reservation on the part of the system) can quickly use these highly-performant attachments (during a comparatively brief pre-warming phase only, as opposed to the entire application execution, which could take minutes, hours, days, or the like) and then switch to a lower performant attachment type. Upon that switch, which does not negatively impact the application's performance, the reserved or dedicated resource capacity from the more highly performant attachment type can be reclaimed by the system and used for other purposes, thereby increasing the overall efficiency, capability, and capacity of this system.

Accordingly, the present examples provide technical solutions that constitute an improvement to computer-related technology in that application performance (e.g., in terms of execution time, initially observed to be 40% faster or more) can be substantially improved while the capabilities of the underlying network block volume system can also be similarly improved. Thus, techniques described and suggested in the present disclosure improve the field of computing, specifically the field of persistent data storage and application execution performance, by providing applications rapid access to volume data and reducing resources "wasted" by other systems where applications would need to "hold on" to high performance volume attachments throughout their execution.

FIG. 1 is a diagram illustrating an environment for optimized file scanning using multi-type volume attachments and sequential block read pre-warming according to some examples. In an example, a service 102 (e.g., a hardware virtualization service, a malware protection service, etc.), a block storage service 104, and optionally an object storage service 111 operate as part of a cloud provider network 100 and each comprise one or more software modules executed by one or more electronic devices at one or more data centers and/or geographic locations. The cloud provider network 100 in FIG. 1 shows only a service 102, block storage service 104, and object storage service 111 for illustrative purposes; in general, a cloud provider network 100 may provide many different types of services as part of the cloud provider network 100 service offerings. Moreover, although the services in FIG. 1 are shown in the context of a cloud provider network 100, in general, the examples described herein can be used in other environments, such as those utilizing network-based and/or distributed storage environments.

A cloud provider network 100 (also referred to herein as a provider network, service provider network, etc.) provides users with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources can be provided as services (e.g., service 102, object storage service 111, block storage service 104), such as a hardware virtualization service that can execute compute instances, a storage service that can store data objects, etc. The users 126 (or "customers") of cloud provider networks 100 can use one or more user accounts that are associated with a customer account, though these terms can be used somewhat interchangeably depending upon the context of use. Cloud provider networks are sometimes "multi-tenant" as they can provide services to multiple different customers using the same physical computing infrastructure.

Users 126 (via electronic devices 128) can interact with a cloud provider network 100 across one or more intermediate networks 116 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) can be part of, or serve as a front-end to, a control plane of the cloud provider network 100 that includes "backend" services supporting and enabling the services that can be more directly offered to customers.

Thus, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Generally, the traffic and operations of a provider network can broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes user resources that are implemented on the provider network (e.g., computing instances, containers, block storage volumes, databases, file storage). Data plane traffic generally includes non-administrative operations, such as transferring user data to and from the user resources. The control plane components are typically implemented on a separate set of servers from the data plane servers, and control plane traffic and data plane traffic can be sent over separate/distinct networks.

To provide these and other services, cloud provider networks 100 often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code—typically without the user having any control of or knowledge of the underlying compute instance(s) involved.

As described herein, one type of service that a provider network may provide may be referred to as a "managed compute service" that executes code or provides computing resources for its users in a managed configuration. Examples of managed compute services include, for example, an on-demand code execution service, a hardware virtualization service, a container service, or the like.

An on-demand code execution service (referred to in various examples as a function compute service, functions service, cloud functions service, functions as a service, or serverless computing service) can enable users of the cloud provider network 100 to execute their code on cloud resources without having to select or manage the underlying hardware resources used to execute the code.

A hardware virtualization service (referred to in various implementations as an elastic compute service, a virtual machines service, a computing cloud service, a compute engine, or a cloud compute service) can enable users of the cloud provider network 100 to provision and manage compute resources such as virtual machine instances. Virtual machine technology can use one physical server to run the equivalent of many servers (each of which is called a virtual machine), for example using a hypervisor, which can run at least partly on an offload card of the server (e.g., a card connected via PCI or PCIe to the physical CPUs) and other components of the virtualization host can be used for some virtualization management components. Such an offload card of the host can include one or more CPUs that are not available to user instances, but rather are dedicated to instance management tasks such as virtual machine management (e.g., a hypervisor), input/output virtualization to network-attached storage volumes, local migration management tasks, instance health monitoring, and the like). Virtual machines are commonly referred to as compute instances or simply "instances." As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

Another type of managed compute service can be a container service, such as a container orchestration and management service (referred to in various implementations as a container service, cloud container service, container engine, or container cloud service) that allows users of the cloud provider network to instantiate and manage containers. In some examples the container service can be a Kubernetes-based container orchestration and management service (referred to in various implementations as a container service for Kubernetes, Azure Kubernetes service, IBM cloud Kubernetes service, Kubernetes engine, or container engine for Kubernetes). A container, as referred to herein, packages up code and all its dependencies so an application (also referred to as a task, pod, or cluster in various container services) can run quickly and reliably from one computing environment to another. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). While multiple virtual machines can run on one physical machine, each virtual machine typically has its own copy of an operating system, as well as the applications and their related files, libraries, and dependencies. Some containers can be run on instances that are running a container agent, and some containers can be run on bare-metal servers, or on an offload card of a server.

As indicated above, a cloud provider network 100 can include a block storage service 104 that provides persistent block storage volumes (for example, logical storage volume 114) for use with various types of compute instances 108 and other computing resources in the cloud provider network 100. These logical storage volumes (or "logical data storage volumes" or "storage volumes" or just "volumes") can be referred to as being network-attached, in that the storage volume data 113 is stored and provided for an instance-attached volume (e.g., logical storage volume 114) by a separate service reachable across a network.

In some examples, storage volumes provided by a block storage service 104 can be replicated (as storage volume data 113) within the cloud provider network to protect against various types of failures, offering high availability and durability for the storage volumes. In general, each storage volume can provide any amount of storage capacity depending on a user's needs (for example, a cloud provider network 100 may provide storage volumes ranging from 1 gigabyte (GB) to 64 terabytes (TB) in size or any other range). Once a storage volume is created at an object storage service 104, it can be attached to a compute instance (for example, a compute instance 108 hosted by a computing device 106, which may be managed by a hardware virtualization service). When a logical storage volume 114 is attached to a compute instance 108, the volume appears to the compute instance as a mounted device similar to any hard drive or other block device. At that point, compute instance 108 can interact with the volume just as it would with a local drive, formatting it with a file system, writing files to it, reading files from it, installing applications on it, etc. Typically, a storage volume 114 is attached to only one compute instance 108 at a time, and potentially many storage volumes 114 can be attached to a single compute instance 108. However, in some cases, a single storage volume 114 can be attached to two or more separate compute instances 108 either permanently or temporarily (for example, during a process for migrating a compute instance 108 from one computing device 106 to another). In some examples, a storage volume 114 can be used as a boot partition for a compute instance 108, which enables users to preserve boot partition data beyond the life of a compute instance 108. In some examples, a single storage volume 114 can be stored by storage devices 112 as multiple partitions across two or more separate storage servers 110. In such a case, a computing device 106 hosting a compute instance 108 that attaches a storage volume 114 stored across multiple storage servers 110 can establish a separate connection with each of the respective storage servers and can manage input/output (I/O) interactions with the storage volume for the compute instance.

The example shown in FIG. 1 includes a compute instance 108 that may be "owned" by a service 102 but managed/hosted by a hardware virtualization service 102. The compute instance 108 has attached one or more logical storage volumes 114 managed by a block storage service 104. As shown, the compute instance 108 can be hosted by a computing device 106 along with other compute instances on the same computing device, or a compute instance 108 can be the only compute instance hosted by a computing device. Each of the storage servers 110 can host any number of separate storage volumes, which can be stored at any number of underlying storage devices (for example, on hard disk drives (HDDs), solid-state drives (SSDs), or any other type of storage devices or combinations thereof). As indicated above, in some examples, a storage volume can also be stored across one or more separate storage servers.

In some examples, the data associated with a volume may be stored by a separate storage system, such as storage volume data 113 stored by an object storage service 111. An object storage service can allow for the storing and retrieval of nearly any type of data, and provide highly-durable, available, performant, secure, and highly scalable storage for its users. Using such a service, applications can be built that easily make use of cloud native storage. Users can use such services in a highly flexible manner, storing any type and amount of data that is needed, reading the same piece of data a million times or only for emergency disaster recovery, etc. Accordingly, the block storage service 104 may use an object storage service 111 as a "backend" storage for all of its storage volume data 113, but may obtain this storage volume data 113 and place it within its own storage devices 112 when it is (or will be) actively used, providing faster access to its contents to the compute instances 108 interacting with these volumes.

In some examples, some or all of the computing devices 106 utilized by the service 102 (and possibly hosted or provided by a hardware virtualization service) include one or more of hardware processing elements, system memory, interconnects, one or more I/O proxy devices (each of which includes one or more separate hardware processing elements), and optionally one or more local data storage devices.

In an example, a hardware processing element is generally any type of processor capable of executing instructions. For example, in various examples, a hardware processing element is a general-purpose or embedded processor implementing any of a variety of instruction set architectures (ISAs), such as the x86, ARM, PowerPC, SPARC, or MIPS ISAs, or any other suitable ISA. In multiprocessor systems, each of hardware processing elements may commonly, but not necessarily, implement the same ISA. In examples with multiple hardware processing elements, each processing element can have a dedicated bank of system memory or share system memory with other hardware processing elements. In some examples, a hardware processing element accesses system memory via a memory bus or via an interconnect. A hardware processing element can include one or more processor cores, each having one or more levels of dedicated or shared cache (for example, L1 cache, L2 cache, and so forth).

In an example, system memory stores program instructions and other data accessible by hardware processing elements. In other examples, program instructions and/or data can be received, sent, or stored on different types of computer-accessible media. In various examples, system memory is implemented using any suitable computer-accessible storage medium. Generally speaking, a computer-accessible storage medium can include non-transitory storage media or memory media such as magnetic or optical media, for example, a disk or DVD/CD coupled to computer system via an interconnect. A non-transitory computer-accessible storage medium may also include any volatile or non-volatile media such as random-access memory (RAM) (for example, SDRAM, static RAM, dynamic RAM (DRAM), double data rate (DDR) SDRAM, and the like), read only memory (ROM), or other non-volatile memory (for example, Flash). Computer-accessible media may include transmission media or signals such as electrical, electromagnetic, or digital signals, conveyed via a communication medium such as a network and/or a wireless link, such as may be implemented via a network interface. In such cases, a computing device may access program instructions and data from a remote computer-accessible storage medium via the computer-accessible media.

In an example, a computing device 106 optionally includes one or more network interfaces that allow data to be exchanged between the computing device and other electronic devices attached to a network or networks, such as other computing devices 105, storage servers 110, or any other hardware within a cloud provider network 100 of which the computing device is a part, or with other computing devices external to the cloud provider network. In some examples, a computing device 106 includes one or more I/O proxy devices, each including its own one or more network interfaces that may be separate from other network interfaces of the computing device 106. In various examples, a network interface of a computing device 106 or a network interface of an I/O proxy device supports communication via any suitable wired or wireless data network, such as Ethernet (for example, IEEE 802.3), IEEE 802.11, IP-based networks, Fiber Channel, Infiniband, and the like. These network interfaces may support communication via telecommunications/telephony networks such as analog voice networks or digital fiber communications networks any other suitable type of network and/or protocol.

In an example, a computing device 106 includes interconnects that coordinate I/O traffic between components of the device, such as between hardware processing elements, memory, network interfaces, I/O proxy devices, and any other components that may be coupled to interconnects. Interconnects generally facilitate communication by a protocol that controls the timing, sequence, form, and content of data being exchanged among components. Example interconnects and protocols include QuickPath Interconnect (QPI), Peripheral Component Interconnect (PCI), Universal Serial Bus (USB), Small Computer System Interface (SCSI), Serial Attached SCSI (SAS), AT Attachment (ATA), Ethernet, variants or progeny of each, and the like. Multiple different interconnects may couple components of a computing device 106. For example, some components may be connected with an I2C bus, others with a PCI bus, and others with both the PCI bus and the I2C bus. In some examples, bridges relay communications between different types of interconnects (for example, from one device on a first interconnect, through a bridge, to another device on a second interconnect).

In some examples, the hardware processing elements of a computing device 106 include one or more special purpose (SP) processors. In examples with multiple SP processors, each SP processor may have a dedicated bank of memory or may share memory with other SP processors. Each SP processor might be an accelerator, coprocessor, field-programmable gate array (FPGA), application-specific integrated circuit (ASIC), or other processing device that can perform specialized operations (for example, graphics rendering, encryption and decryption, and so forth). A computing device 106 can include one or more than one type of SP processor.

A computing device 106 can include one or more local data storage devices. In some examples, local data storage devices provide block storage via one or more logical volumes to software executing on the computer system, including to one or more customer compute instances 108 that may be virtualized on a computing device 106. Hardware processing elements and/or other devices (for example, direct memory access (DMA) controllers, and so forth) can access local storage volume(s) to store and retrieve code and/or data. Local data storage devices generally include non-transitory computer-readable media, such as magnetic disks, optical disks, flash memory devices, phase-change memory devices, RAM, ROM, and the like.

A computing device 106 can additionally or alternatively access one or more remote and network-accessible data storage devices (for example, storages device 112) via one or more networks. These remote, network-accessible data storage devices similarly can provide block storage via logical volumes (for example, logical storage volume 114) to software executing on the computing device 106, including to compute instances 108 running on the device. In some examples, the use of network-accessible data storage devices 112 is managed by a block storage service 104 of a cloud provider network 100. In some examples, a computing device 106 includes one or more other I/O devices that can store, process, and/or communicate code and/or data for the computing device.

In an example, a computing device 106 includes one or more I/O proxy devices. In some examples, each of the I/O proxy devices is at a component interface to the computing device 106. For example, an I/O proxy device can reside between hardware processing elements of a computing device 106 and one or more data storage devices (for example, local data storage device(s), network-accessible data storage device(s), or both). An I/O proxy device generally may be included between any I/O devices of a computing device 106 and the hardware processing elements of the computing device. In addition to interfacing to one or more local interconnects, an I/O proxy device may include one or more network interfaces that enable the I/O proxy device to communicate with external components.

In some examples, an I/O proxy device (including any hardware processing elements, I/O proxy device memory, and network interface(s)) is part of an "offload card" (for example, a PCI Express-based card) that is connected to the motherboard of the computing device, and a computing device 106 can include one or more such offload cards. For example, a computing device 106 can include one offload card that is connected to a control plane of a cloud provider network 100 (via a network interface of the offload card) of which the computing device 106 is a part, and also include another offload card that is connected to a data plane network of the cloud provider network 100 and that can be configured to perform various I/O and state exchanging processes as described herein. In this example, the offload card can establish connections with remote storage servers 110, manage I/O operations, exchange state information with remote storage servers and other system components, and so forth. In other examples, both the control plane and data plane functionality can be implemented and performed using a single offload card.

An I/O proxy device executes software used to enable virtualization of a computing device 106 (for example, enabling execution of customer compute instances 108 on the computing device) by offloading operations that would otherwise be performed by the other processor(s) in the computing device. An example operation is coordinating shared resources amongst virtualization instances, such as in situations where multiple customer compute instances 108 compete for access to a single device, such as a network interface. Another example operation is device emulation to enable software executing on a hardware processing element to interact with one or more local data storage device(s) or network-accessible data storage device(s). In addition to offloading virtualization management from other processors in a computing device 106 to the I/O proxy device, an I/O proxy device can provide inter- and intra-system security to isolate compute instances 108 that may be allocated to different customers and executing on different processors within the computing device 106 and to isolate those instances from the remainder of a cloud provider network 100 of which the computing device 106 may be a part. In an example, the multi-tenant operation of a computing device 106 enables two or more different customers of a cloud provider network 100 to concurrently run compute instances on the system.

In some examples, an I/O proxy device includes functionality used to manage compute instances 108 executing on a computing device. Such management can include pausing and un-pausing compute instances, launching and terminating compute instances, performing memory transfer and copying operations, and so forth. In some examples, these operations are performed by a hypervisor that works with the I/O proxy device that is executed by one or more other hardware processing elements of the computing device 106 (for example, the hypervisor can direct the I/O proxy device to create or destroy virtual devices for virtual machines on the server). In other examples, no hypervisor executes on the other hardware processing elements of the computing device 106. In such examples, the hypervisor executed by the I/O proxy device can accommodate requests from the other processors.

Program instructions and any other data for the hardware processing elements of the I/O proxy device is stored on an I/O proxy device memory accessible by hardware processing elements of the I/O proxy device, similar to how system memory stores program instructions and data accessible by hardware processing elements, as described above. In an example, the I/O proxy device memory includes storage of code used to manage communication channels with remotely accessible storage volumes and other system components, as described elsewhere herein.

As indicated above, a computing device 106 may at any point in time be executing one or more applications (for example, user applications 107, prewarmer 109) hosted by one or more guest operating systems, where these guest operating systems and applications execute on the hardware processing elements. The guest operating systems have access to some hardware components (for example, via software drivers) and access to other hardware components via software executing on the I/O proxy devices. Access to I/O devices via an I/O proxy device is generally transparent to the guest operating systems and user applications. For example, a guest operating system executing on a hardware processing element can initiate an I/O request message to a local or remote data storage device 112 as if it were in direct communication with the local or remote data storage device via an interconnect, even through traffic between the hardware processing element and local or remote data storage device is routed through the I/O proxy device.

In the example of FIG. 1, a storage server 110 manages storage volume data 113 for one or more storage volumes, each of can be attached to an instance running on a computing device 106. For example, a compute instance 108 can include one or more block device mappings 120, each corresponding to a storage volume 114 hosted by a storage server 110. In an example, the block device mappings 120 generally define the block storage devices that are attached to a compute instance 108. In some examples, block device mappings 120 can be specified as part of an image used to launch a compute instance 108 so that the block device mappings are used by any instances launched based on the image. Alternatively, block device mappings 120 can be specified when a compute instance 108 is launched or at any point after a compute instance 108 is launched, thereby causing the compute instance to attach the block storage volumes specified by the block device mappings 120. As indicated above, once a storage volume 114 is attached to a compute instance 108 via a block device mapping 120, the storage volume 114 can be mounted by the compute instance 108 so that the compute instance can access the storage volume. A storage volume 114 can also be detached from a compute instance 108 to which it is attached, at which point the compute instance can no longer access the storage volume.

In an example, the process of attaching a storage volume 114 to a compute instance 108 involves creating a network-based communication channel (represented by the connection 118) between a computing device 106 hosting the compute instance 108 and a storage server 110 (or creating multiple connections if the volume is stored across multiple storage servers). This connection 118 between a computing device 106 and a storage server 110 can be implemented in various ways and can be based on a variety of different protocols (for example, the Transmission Control Protocol (TCP) or any other data exchange protocols). For example, at the computing device 106, the logic for handling such connections 118 in some architectures is offloaded from the hardware exposed to the compute instances 108 and onto an "offload card," as described above. In this example, software on an offload card can be responsible for both sending and receiving storage I/O traffic to/from storage servers 110, in addition to tasks like establishing and maintaining the network connections with the storage servers 110, identifying which of the various storage servers 110 is responsible for managing the storage volumes 114 (or portions of a storage volume) that are used by various compute instances 108 running on the computing device 106, among other operations. In other examples, the management of connections 118 between computing devices 106 and storage servers 110 can be implemented at the client-side by a hypervisor, for example, in a privileged "host domain" managed by the hypervisor, by individual compute instances 108, or by any other software or computing device system component.

A block storage service 104 generally includes a fleet of purpose-built storage servers. These storage servers similarly can comprise various hardware platforms (some of which, for example, may include one or more I/O proxy cards and other possible components described above in connection with computing devices) and are generally managed on servers that are independent of a hardware virtualization service or other services. The management of the computing device-storage server connections similarly can be implemented at the server-side at I/O proxy cards, by hypervisors or other software running on the storage servers, or by other server components depending on particular hardware platforms used.

As used herein, a logical data storage volume (also referred to as "storage volume," just "volume," etc.) may store data according to a block-based layout. Thus, a block (also referred to as a "data block") may be an addressable region in a block-level storage device. The address where the addressable region in the block-level storage device can be individually located may be referred to as a block address, or location. A host can communicate with the block-level storage device according to a non-proprietary protocol, such as a small computer command interface (SCSI) protocol (e.g., SCSI-3). Commands of the non-proprietary protocol may be embedded to enable transport of the commands over various media (e.g., SCSI over Internet Protocol (IP), fiber channel protocol (FCP)). Thus, in some examples, a volume may be a logical storage space within a data storage system in which data may be stored. A logical data storage volume 114 may be identified by a volume identifier. Data for the logical data storage volume 114 (here, storage volume data 113) may reside in one physical storage device (e.g., a hard disk), may comprise multiple partitions distributed across multiple storage devices, etc.

The logical data storage volume 114 may be provided via a set of storage nodes. In some examples, a "storage node" may refer to or include one of a set of one or more storage devices 112 (e.g., hard drives) usable for hosting storage volumes. Thus, a storage node may host multiple volumes, which may or may not be assigned to the same user. For example, a first volume associated with a first user may be comprised of blocks A, B, C, and D on storage nodes W, X, Y, and Z respectively. A second volume associated with a second user may be comprised of blocks E, F, G, and H also on respective storage nodes W, X, Y, and Z.

The hardware configuration of storage nodes may include network interfaces, racks, switches, hard disk drives (HDDs), solid-state drives (SSDs) or other storage devices, processors, memory, or any other physical component of the storage nodes. The software configuration of the storage nodes may include logical volume placement algorithms, operating systems, hypervisors, throttling applications or other applications managing customer access to computing resources of the storage nodes, and any other application loaded into memory of the storage nodes. The storage nodes may be accessible by an IP address or other network information. Example of a storage node is a network (e.g., Ethernet) attached storage (NAS) device, a storage area network (SAN) storage device, or a NAS-SAN hybrid storage device. NAS protocols include network file system (NFS), server message block/common internet file system (SMB/CIFS), and Apple filing protocol (AFP). SAN protocols include Fibre Channel, iSCSI, AT Attachment over Ethernet (AoE), and HyperSCSI.

The logical data storage volume 114 may be operationally attached to the computing instance 108 to serve as logical storage units (e.g., a virtual drive) for the compute instance. Note, however, it is also to be understood that the logical data storage volume 114 as described in the present disclosure could alternatively be operationally connected to a physical (i.e., non-virtual) computing device. The logical data storage volume 114 may enable the persistent storage of data used/generated by an operationally attached computer system (physical or virtual). Furthermore, in some examples, the host computing device 106 may be a computing device that is physically located on premises of a user or a third-party provider.

Generally, a service 102 may seek to execute an application 107 that utilizes data of a logical storage volume 114. The application 107 can be one managed or performed by the cloud provider network 100, or one executed more directly on behalf of a user 126. As one example, the application 107 may be a malware detection application that scans files of a logical storage volume 114 in an effort to seek to identify any potential malware (or other malicious code) existing on the volume. For example, the service 102 may be a malware detection service that attempts to find malicious code within files from user's volumes. Thus, the service 102 (or a cooperative service) may create a "snapshot" (e.g., a point-in-time copy or identification) of a user's volume, attach a logical storage volume 114 based on that snapshot (e.g., by issuing a call to the block storage service 104 identifying the snapshot and the compute instance 108) to its own "service" instance 108 (that itself executes the application 107), and then scan each file of the volume via the application 107.

However, in such systems, upon the attachment of the volume 114 to the instance 108, this volume may suffer from a volume hydration issue in that none (or minimal amounts) of the data of the volume is actually present locally on the computing device 106 (e.g., in RAM, disk, etc., as locally-cached volume data 122). Instead, as described herein, with network-provided volumes 114, the data is typically obtained on a file-by-file basis when the application 107 attempts to read a file or set of files—e.g., the computing device 106 issues a request to read the files which is sent, via a network, to the storage server 110, which may have the needed storage volume data 113 already present, or may need to itself obtain the needed storage volume data 113 from another system (such as object storage service 100). Thereafter, the storage server 110 can provide the data back to the computing device 106 to be stored locally as locally cached volume data 122 in volatile or non-volatile storage. This process can thus introduce a very high latency for file read operations. While this delay is avoided for files that are read multiple times through use of this cache, in some scenarios these files may not ever be read again—such as by a malware scanner. Thus, this presents a cold start problem where the application 107 must wait a significant amount of time to access the data, which afterward may then never be used again and thus be discarded. Moreover, these file reads often reference a variety of different storage blocks that actually store the data in a "random" manner, meaning the data blocks storing data for a file may be dispersed in different locations on a single storage device (e.g., disk), multiple storage devices, multiple data centers or geographic locations, or the like. Thus, such accesses are fundamentally inefficient, providing further delay for the application 107 in obtaining the data.

These and other issues can be avoided with examples disclosed herein. For example, as depicted with reference to illustrated circle (1A), a control plane 130 (executed by one or more computing devices 105) of the service 102 can first cause the logical storage volume 114 to be attached to a compute instance 108 by sending a command to the block storage service 104. This command may include data that identifies the desired action (e.g., attach a volume), the desired instance(s) 108, and potentially a snapshot (or point-in-time representation) of a storage volume that already exists from which the volume is to be created from.

The command can also indicate that the volume 114 is to be attached according to a first attachment type, such as one providing low latency, and/or a relative high amount of IOPS, and/or a large amount of bandwidth. In some examples, a block storage service 104 can provide different volume types (also referred to as volumes of different attachment types). Different volume types can allow users to optimize the storage performance and cost for a broad range of applications. These volume types may be divided into different categories based on their performance profiles, e.g., SSD-backed storage for transactional workloads, such as databases, virtual desktops and boot volumes, HDD-backed storage for throughput intensive workloads, such as MapReduce and log processing, etc. Each category may include one or multiple different volume (attachment) types, where ones of these types may provide comparatively higher or lower throughput than others, higher or lower latency than others, higher or lower IOPS than others, higher or lower bandwidth, or the like. Thus, some volume attachment types are for high performance, some may provide a balance of performance (and price), some may provide benefits for high throughput frequently accessed data, while others may provide benefit for infrequently accessed data. For example, one volume type could provide 64,000 IOPS and 1,000 MB/s throughput with single digit millisecond latencies, while a second volume type could provide 500 IOPS and 10,000 MB/s throughput with comparatively much higher latencies.

To support and thus offer these volume attachment types, the block storage service 104 may use a variety of different technological systems and techniques. For example, to support a volume type with low latency, the block storage service 104 may place a large amount (or all) of the underlying storage volume data 113 in a "fast access" storage tier (e.g., in RAM). Similarly, to support a volume type with higher throughput but higher latency, the block storage service 104 may place the underlying storage volume data 113 in an HDD or may not actively cache the data itself but instead obtain it on an as-needed basis from an object storage service 111.

Notably, the resources needed to provide certain volume types may be more limited in nature, more expensive, etc. For example, the amount of fast-access storage (e.g., RAM) may be comparatively much more limited than the amount of slow-access (but perhaps high throughput) storage available, such as HDD or that provided by an object storage service 111. Thus, given this relative scarcity, it may be imperative to have users utilize these types of volumes only when truly needed, and thus keep them available for others. However, in practice this may not occur as much as desired, as deep-pocketed users may simply obtain these volumes without regard for others, regardless of whether they are actively needing their provided performance characteristics at all times (or, at all). This limits the number of users that can be provided these services, whether through exhaustion of resources or other disincentives implemented to keep these volume types available.

Accordingly, upon transmission of the command sent at circle (1A), the service 102 thereby causes the logical storage volume 114, of the first attachment type (having comparatively low latency, high bandwidth, and/or high IOPS) to the compute instance 108 at circle (1B).

Thereafter, a prewarmer 109 module can utilize this volume 114 at circle (2) to prewarm (or "preload") some or all of the storage volume data 113 onto the computing device 106 as locally cached volume data 122 and thus become easily (i.e., quickly) available to the compute instance 108 for use. In some examples, the prewarmer 109 issues requests to an underlying operating system to read data, from the volume/disk, at particular locations. Thus, in contrast to seeking to read files (which requires translation into the associated blocks, which are often randomly accessed), the prewarmer 109 can immediately make "raw" disk reads—e.g., to seek to position zero of the disk and read some number of bytes (e.g., a 4K block at a time). In some examples, this can occur according to a sequential access pattern, whereby the prewarmer 109 reads portions of data, from the disk, in a sequential manner by reading a block (or sector) at a time, and then the next block (or sector), and the like. This can continue until the entire volume is read, until an amount of space available on the computing device 106 for the locally cached volume data 122 is fully consumed or consumed to some threshold amount, etc. By way of example, one way to make these "raw" reads could be through a utility such as the well-known "fio" (flexible I/O tester) utility offered in some operating system distributions, which is a tool that can spawn a number of threads or processes doing a particular type of I/O action as specified by the caller.

Though prewarmer 109 is illustrated as being executed by (or "in") a compute instance 108 (e.g., as an application-level module or package, such as executable or interpretable code within a user space), it is to be understood that it can also be deployed in other ways. For example, the prewarmer 109 can be implemented as a module that is part of an operating system itself (e.g., in a kernel space), part of a hypervisor or other virtual machine manager component (e.g., which may be executed by an offload card described herein), etc.

In some examples, the sequential raw disk reads can occur based on volume usage metadata. The volume usage metadata can be indicative of usage characteristics of the logical storage volume, and the pre-warming can occur based at least in part on an analysis of the volume usage metadata. For example, the volume usage metadata may include identifiers of areas (e.g., blocks, groupings of blocks, sectors, portions, disks, etc.) of the volume that are known to be used or not used to store legitimate data, which may have been generated by the block storage service 104 or another service (e.g., a hardware virtualization service that hosts compute instances). As one example, the volume usage metadata could comprise a bitmap indicating which corresponding chunks of the volume (e.g., 1 GB chunks) are used to store data, or include some threshold amount of data, etc. In some examples, using this metadata that identifies utilized areas (e.g., blocks) of the volume, the prewarming may include issuing requests for just those areas of the volume, and this may or may not still involve sequential reads. As another example, the metadata could identify locations where particular types of files are stored (e.g., all ZIP files, EXE files, BAT files, or the like), allowing for blocks that store data for particular files to be obtained—this can be particularly beneficial for some application types, such as malware scanners seeking to examine certain file types, as only those files are fetched and the entire prewarming process can occur even faster.

When the logical storage volume 114 is prewarmed by the prewarmer 109, and some or all of the storage volume data 113 is rapidly available as locally cached volume data 122 at circle (3), then at circle (4A) the control plane 130 can cause the attachment type of the volume 114 to be switched to utilize a second volume attachment type having a comparatively lower performance characteristic (e.g., lower IOPS and/or higher latency and/or lower bandwidth) at circle (4B). This can include sending a command, at circle (4A), to the block storage service 104 identifying the requested action (e.g., to change the volume type), the particular new volume type that is desired, and the volume 114. In response, the block storage service 104 can potentially change how it handles the storage volume data 113 for the volume, such as by moving it out of one storage tier (e.g., the limited RAM or SSD tier) and into another (e.g., into a magnetic storage disk/HDD, into only the object storage service 111), thus freeing up the more constrained resources (needed for the first volume attachment type) for use by other users. Notably, this will not affect (or significantly affect) the performance of the application 107, which should already have all (or a substantial majority) of the volume data it will need on-device as locally cached volume data 122 and not need to quickly access additional data from the block storage service 104. Thus, the change is all but invisible to the application 107, which can execute at circle (5) in a highly-performant manner, accessing files rapidly without needing to wait for network-involved block fetching. Thus, for an application 107 such as a malware scanning utility, it can access files of a filesystem stored in the volume extremely quickly, even though these accesses are highly random in nature, while not holding onto the in-demand (and possibly quite expensive) first volume attachment type.

Accordingly, in some examples, a prewarming phase of operation is executed, and after all of the prewarming is completed, the prewarming phase is ended and then the application execution phase is begun. However, in other examples, these phases may partially or completely overlap. For example, in some examples, the prewarming phase begins and after some prewarming has occurred, but prior to completion of prewarming, the application execution is initiated. Alternatively, in some examples both the prewarming phase and application execution phase can be initiated concurrently, or one of these phases can be initiated just before or after the other—all of these configurations have shown at least some benefit over other approaches. Thus, the prewarming and application execution may be implemented in a sequential manner, or in a (at least partially) parallel manner.

Figure 2:
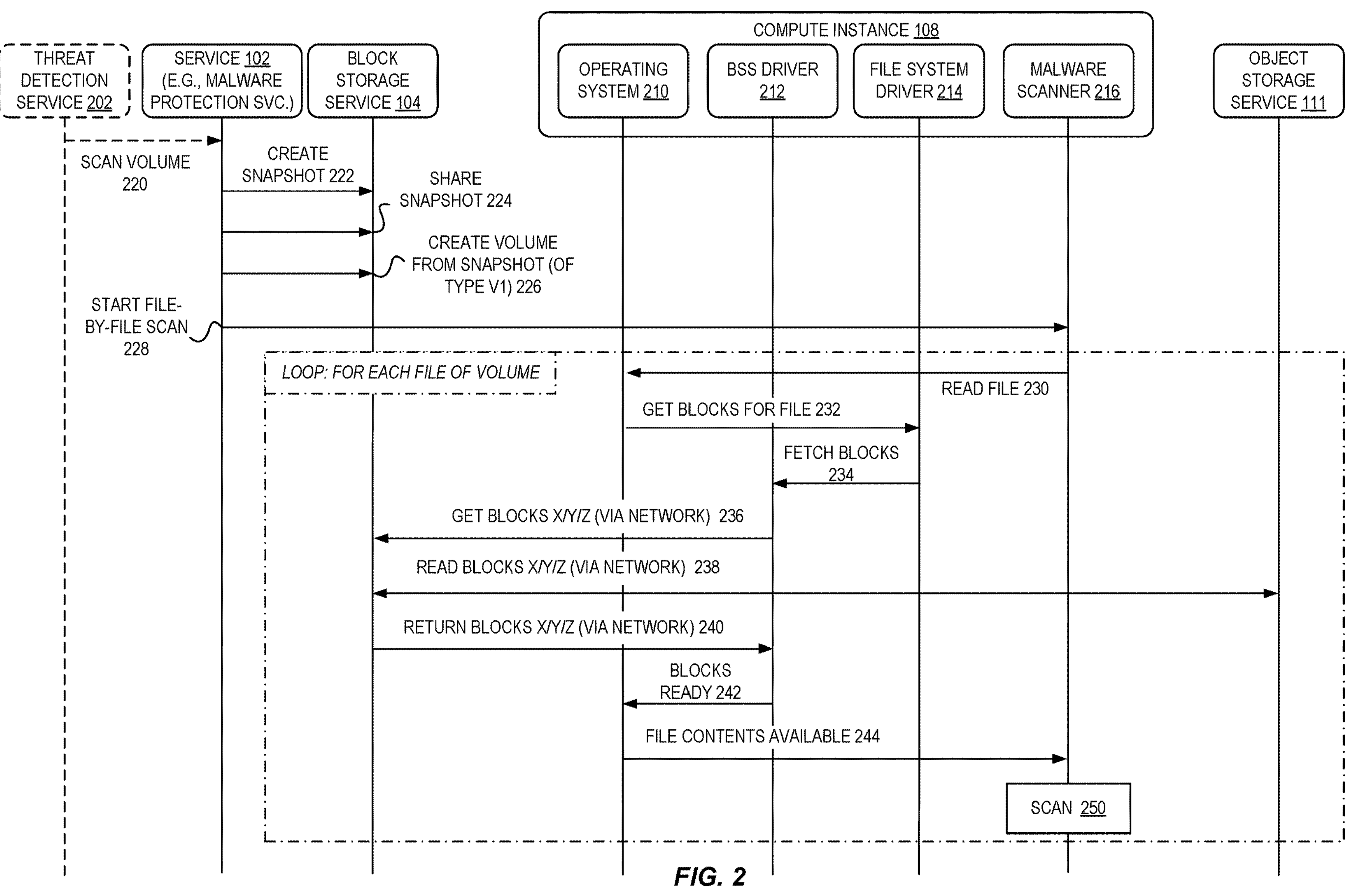
FIG. 2 is a sequence type diagram illustrating messaging and operations of a naive technique for file scanning.

For further understanding, FIG. 2 is a sequence type diagram illustrating messaging and operations of a naive technique for file scanning. In this example, a threat detection service 202 may detect anomalous activity associated with a particular compute instance and can send message 220 instructing the service 102 to scan a particular volume. In response, the service 102 can send a command 222 to the block storage service 104 to create a snapshot of that volume, a command 224 to share the snapshot with a particular service account, and a command 226 to create a volume, for a service compute instance (implementing a malware scanner 216) based on the snapshot with an attachment type of "V1" (indicating either a volume type with comparatively high amount of IOPS or low amount of IOPS, etc.). Thereafter, service 102 can send a command 228 to a malware scanner 216 implemented by the compute instance 108 to begin a file-by-file scan of the volume.

Thus, a loop may be entered by the malware scanner 216 (e.g., for each of a set of files to be scanned), which first seeks to read a file by making a call to an underlying operating system 210, which in turn requests the blocks for the file at 232 from a file system driver 214, which itself may need to interact with a block storage service (BSS) driver 212, which determines whether the files are already local or whether they must be fetched. As this is a cold-start scenario, and each file access is the first, the relevant blocks must be fetched.

Thus, the BSS driver 212 sends one or more requests 236 via network traffic to the block storage service 104 for the needed blocks (here, X and Y and Z), which may itself need to fetch the blocks, via request(s) 238, from an object storage service 111 before returning them at 240 to be saved in some memory or storage. The BSS driver 212 can then notify the operating system 210 directly via 242 that the blocks are ready (or indirectly, via notifying the file system driver 214 first), and thus the file contents (blocks) can be made available to the malware scanner 216 via message 244. Thereafter, the malware scanner 216 can scan the file at block 250. This loop process can repeat for all other needed files.

As shown here, for every file needed, there are a series of messages within the compute instance 108 and more importantly, involving remote entities requiring network communications, not to mention the potential need to read blocks from potentially "slow" storage tiers (e.g., at object storage service 111), which therefore requires the malware scanner 216 to wait a significant amount of time to access each file, slowing down its operation considerably.

Figure 3:
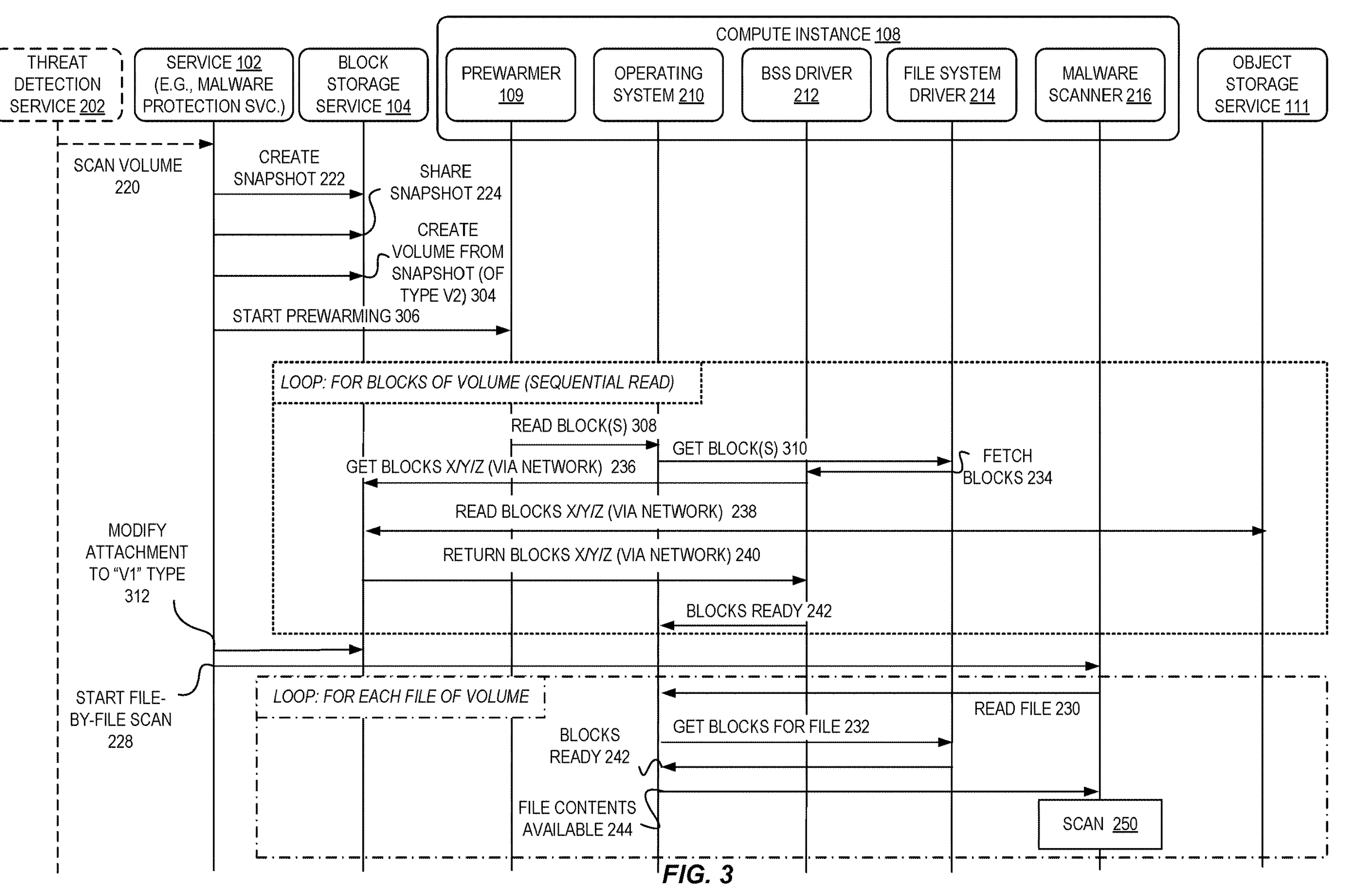
FIG. 3 is a sequence type diagram illustrating messaging and operations for optimized file scanning using multi-type volume attachments and sequential block read pre-warming according to some examples.

Instead, systems implemented using the techniques disclosed herein can provide significant performance improvements for the application as well as capacity/utilization improvements for the block storage service 104. FIG. 3 is a sequence type diagram illustrating messaging and operations for optimized file scanning using multi-type volume attachments and sequential block read pre-warming according to some examples.

In this example, the operations and messaging begin similarly, though the message to create a volume—here at 304—indicates that a comparatively highly-performant (e.g., high IOPS) volume attachment type is desired, and upon its attachment, the service 102 sends a start prewarming command 306 to a prewarmer 109.

The prewarmer 109 then begins a prewarming loop to read one or more blocks of the volume in a (at least partially) sequential manner. This loop includes, at 308 sending a request to read some number of blocks (or other sizes of "raw" data) to the operating system 210, which itself sends a command to fetch the blocks at 310 via a file system driver 214. The file system driver 214 fetches the blocks at 234 by calling the BSS driver 212, which determines that the blocks are not locally available and acts as before via message 236, causing the block storage service 104 to obtain the data via 238 and the object storage service 111, which can be returned to the BSS driver 212 and thereafter directly (via message 242) or indirectly (via the file system driver 214) indicates to the operating system 210 that the blocks are available.

With a prewarmed volume, the service 228 can modify the attachment type of the volume by sending a command at 312 to the block storage service 104 and also instruct the malware scanner 216 to begin its file-by-scan via command 228. Here, the loop is much more straightforward—the malware scanner 216 can read a file via 230, and the operating system 210 can immediately confirm that the blocks are available via messages 232 and 242, and notify the scanner of the file's availability at 244 for its scan 250. Notably, the file-by-file loop executes much faster due to the reduction of messaging and remote data fetching.

Figure 4:
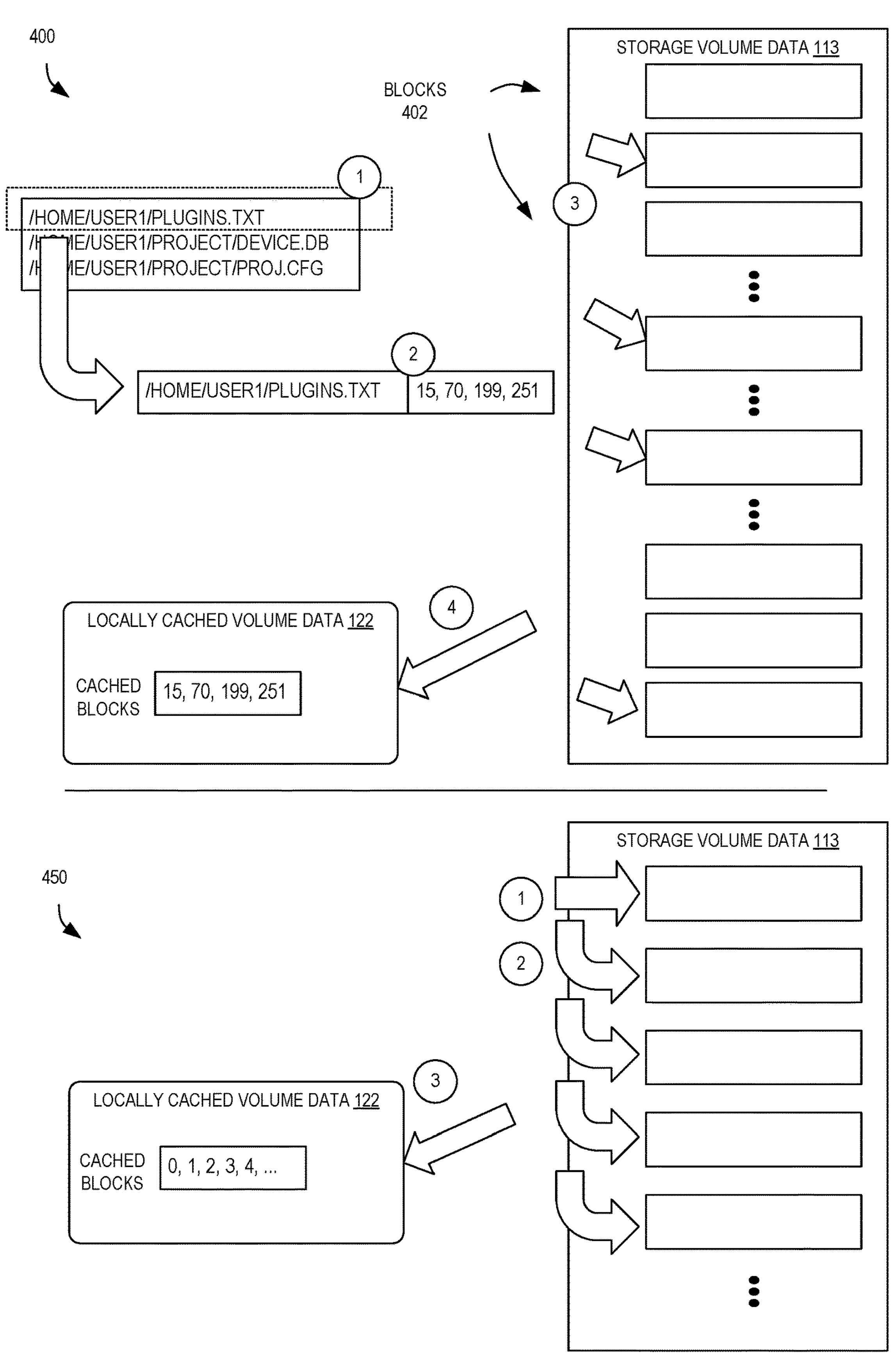
FIG. 4 is a diagram illustrating data access patterns according to naive file-based process and those according to a sequential block-based pre-warming approach according to some examples.

As described herein, utilizing sequential raw disk reads together with the hybrid dual-volume attachment type approach provides further benefits. FIG. 4 is a diagram illustrating data access patterns according to naive file-based process and those according to a sequential block-based pre-warming approach according to some examples. As shown at 400, a naive technique that utilizes file-based data fetching includes at circle (1) identifying a file, at circle (2) identifying the associated data storage blocks storing data of the file, and at circle (3) obtaining ones of the blocks 402 corresponding to those identified locations, which may be on different parts of the storage media, on different storage devices, different computing devices, different racks, data centers, cities, or the like. Thus, additional time is required for such accesses. Thereafter, these blocks are cached at circle (4) within the locally cached volume data 122, used once, and then discarded.

In contrast, at 450 a sequential raw block read approach can be utilized to, at circle (1) read a first set of blocks (or sectors, etc.) and then a next, sequential set of blocks can be read at circle (2), and so on. Often, such blocks are actually stored sequentially, thus allowing for read time efficiency improvements via the benefits of locality, reading systems that might read multiple such sets of blocks at once (e.g., removing the need for every other block access to hit a disk), batching, predictive retrieval of successive sequential blocks, etc. Thereafter, these blocks are cached at circle (1) within the locally cached volume data 122 for use.

Figure 5:
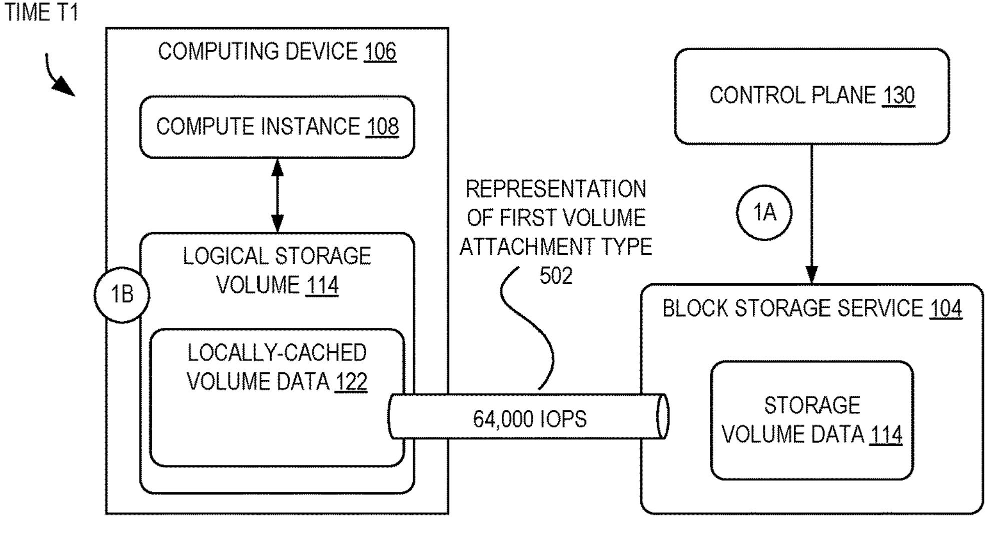
FIG. 5 is a diagram illustrating multi-volume type attachment operations according to some examples.
Figure 5:
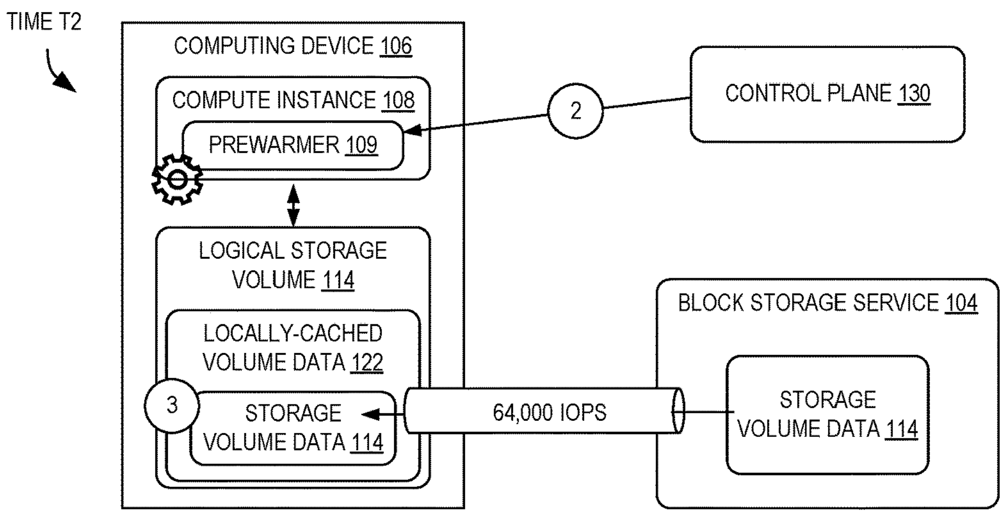
Figure 5:
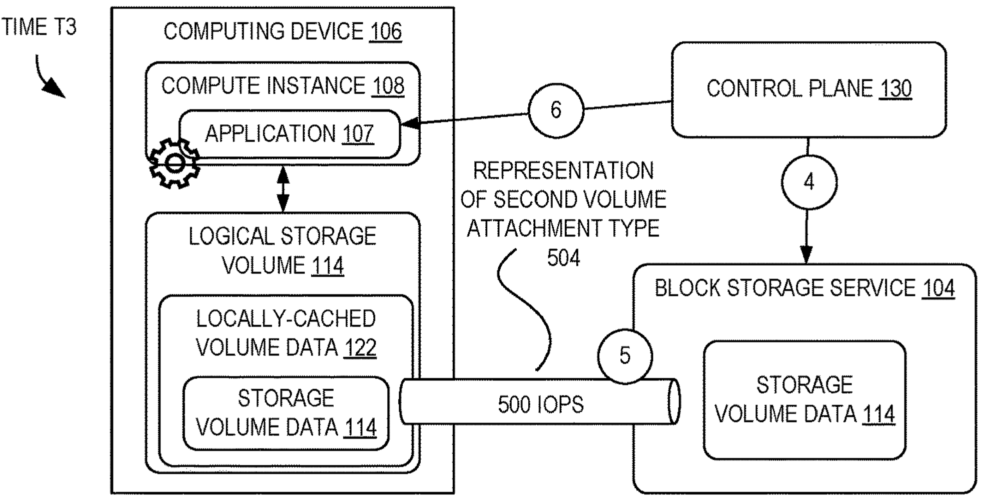

When combined with a hybrid volume type approach, these sequential read techniques may be especially beneficial. FIG. 5 is a diagram illustrating multi-volume type attachment operations according to some examples. As shown at time T1, a control plane 130 can send a request to attach a first volume type to the compute instance 108 at circle (1A), where this attachment 502 provides a particular performance characteristic (e.g., a relatively high amount of supported IOPS). At this point, the attached logical storage volume 114 is not "hydrated" in that it does not include any of the storage volume data 114, as shown at circle (1B).

At time T2, the control plane 130 can send a command to the computing device 106 (e.g., to the prewarmer 109) to begin prewarming the logical storage volume 114 using sequential raw disk reads. As described, this technique can efficiently load the storage volume data 114 to "hydrate" the logical storage volume 114 for use. Thereafter, at Time T3, the control plane 130 can issue a command, at circle (3), to modify the volume's attachment type to a second type 504 that has a comparatively lesser performance characteristic (e.g., has a relatively lower amount of supported IOPS compared to the initial first attachment type level), as represented by circle (5). At circle (6), the control plane 130 sends a command to cause the application 107 to begin (or continue) execution, which benefits from the cached storage volume data 114.

Although examples disclosed herein detail the improved operation of a malware detection service, it is to be appreciated that the hybrid multi-type volume attachment with sequential read prewarming techniques can benefit a variety of other systems and applications. For example, a system that needs to load and execute a very large application, such as a modern video game server, computer assisted drafting (CAD) program, etc., can load much faster. Further, backup-type software can implement these techniques for rapidly fetching a previous state of a system, such as for generating "diffs" (or differences) between a current state of a system and the previous state.

Figure 6:
FIG. 6 is a flow diagram illustrating operations of a method for optimized file scanning using multi-type volume attachments and sequential block read pre-warming according to some examples.
Figure 6:
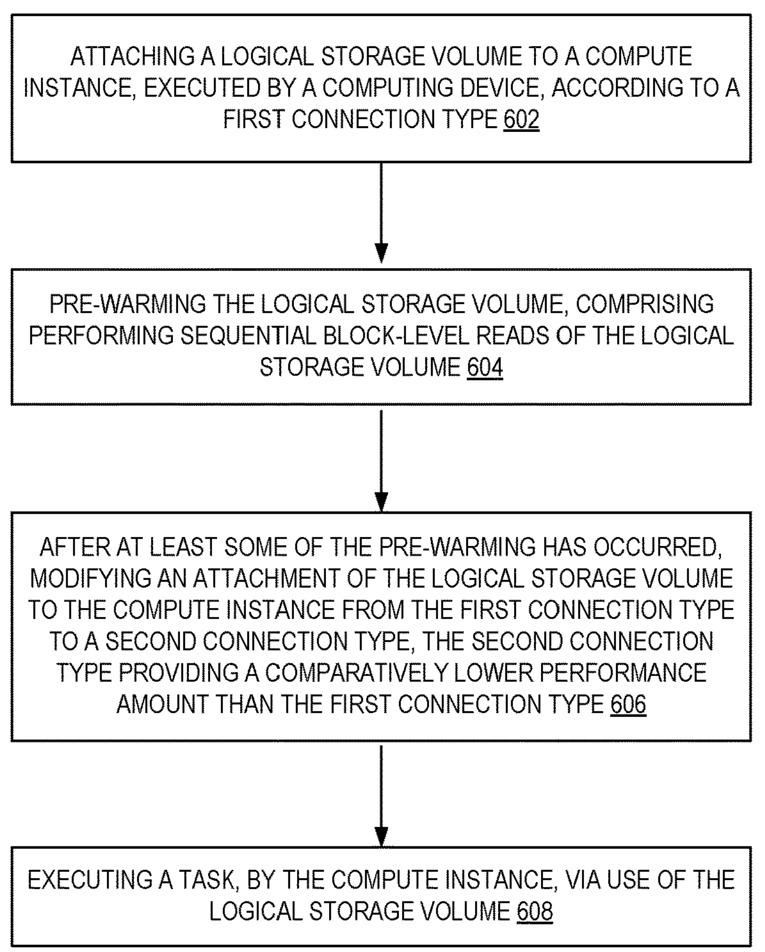

FIG. 6 is a flow diagram illustrating operations 600 of a method for optimized file scanning using multi-type volume attachments and sequential block read pre-warming according to some examples. Some or all of the operations 600 (or other processes described herein, or variations, and/or combinations thereof) are performed under the control of one or more computing devices configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 600 are performed by the service(s) 102 of the other figures.

The operations 600 include, at block 602, attaching a logical storage volume to a compute instance, executed by a computing device, according to a first connection type. The attaching may include sending a request to a (block) storage service of a cloud provider network indicating a command to attach a logical storage volume to a particular compute instance, and may identify a snapshot (taken from another logical storage volume, possibly of a different user/customer of the cloud provider network) that the volume is to be created based on.

In some examples, the logical storage volume is managed by a storage service of a cloud provider network, and wherein the compute instance is executed by a computing device managed by a hardware virtualization service of the cloud provider network, and the operation of block 602 may be performed by another service of the cloud provider network, such as a malware detection service. In some examples, the logical storage volume is a network-connected block storage volume provided by the storage service.

The operations 600 further include, at block 604, pre-warming the logical storage volume, comprising performing sequential block-level reads of the logical storage volume. The pre-warming may be initiated by a prewarmer executed by a same computing device as the compute instance, which can issue block-level "raw" disk/volume reads to an underlying operating system, such as a request to read an amount of data (e.g., an amount of bytes, kilobytes, or the like) at some particular disk/volume offset or location.

In some examples, performing the sequential block-level reads includes transmitting one or more requests, via a network interface of the computing device, to read one or more blocks of data associated with the logical storage volume; receiving, via the network interface, the one or more blocks of data; and storing the one or more blocks in a memory of the computing device.

In some examples, the pre-warming of the logical storage volume comprises issuing a plurality of reads of sectors or blocks of the logical storage volume in a sequential manner starting at the beginning of the logical storage volume. In some examples, the plurality of reads encompasses reading an entirety of the logical storage volume, and wherein the modifying of the attachment occurs after reading the entirety of the logical storage volume.

In some examples, the operations 600 further include obtaining volume usage metadata indicative of usage characteristics of the logical storage volume, wherein the pre-warming occurs based at least in part on an analysis of the volume usage metadata. The volume usage metadata may include identifiers of areas (e.g., blocks, groupings of blocks, etc.) of the volume that are known to be used or not used, which may have been generated by the block storage service or another service (e.g., a hardware virtualization service that hosts compute instances). In some examples, using this metadata that identifies utilized areas (e.g., blocks) of the volume, the prewarming may include issuing requests for just those areas of the volume, and this may or may not still involve sequential reads.

The operations 600 further include, at block 606, after at least some of the pre-warming has occurred, modifying an attachment of the logical storage volume to the compute instance from the first connection type to a second connection type, the second connection type providing a comparatively lower performance amount than the first connection type.

In some examples, the first connection type provides a comparatively larger amount performance amount than the second connection type by at least providing a larger amount of input-output operations per unit time than the second connection type.

In some examples, modifying the attachment of the logical storage volume to the compute instance from the first connection type to the second connection type comprises transmitting, via use of a network interface, a command to a storage service of a cloud provider network to change a volume type of the logical storage volume.

At block 608, the operations 600 further include executing a task, by the compute instance, via use of the logical storage volume. In some examples, executing the task comprises performing a malware scan of a filesystem provided by the logical storage volume. In some examples, the operations 600 further include generating a snapshot of a user volume utilized by a user compute instance within a cloud provider network, wherein the attaching of the logical storage volume is based on use of the snapshot, and wherein the malware scan includes scanning files of the filesystem.

Figure 7:
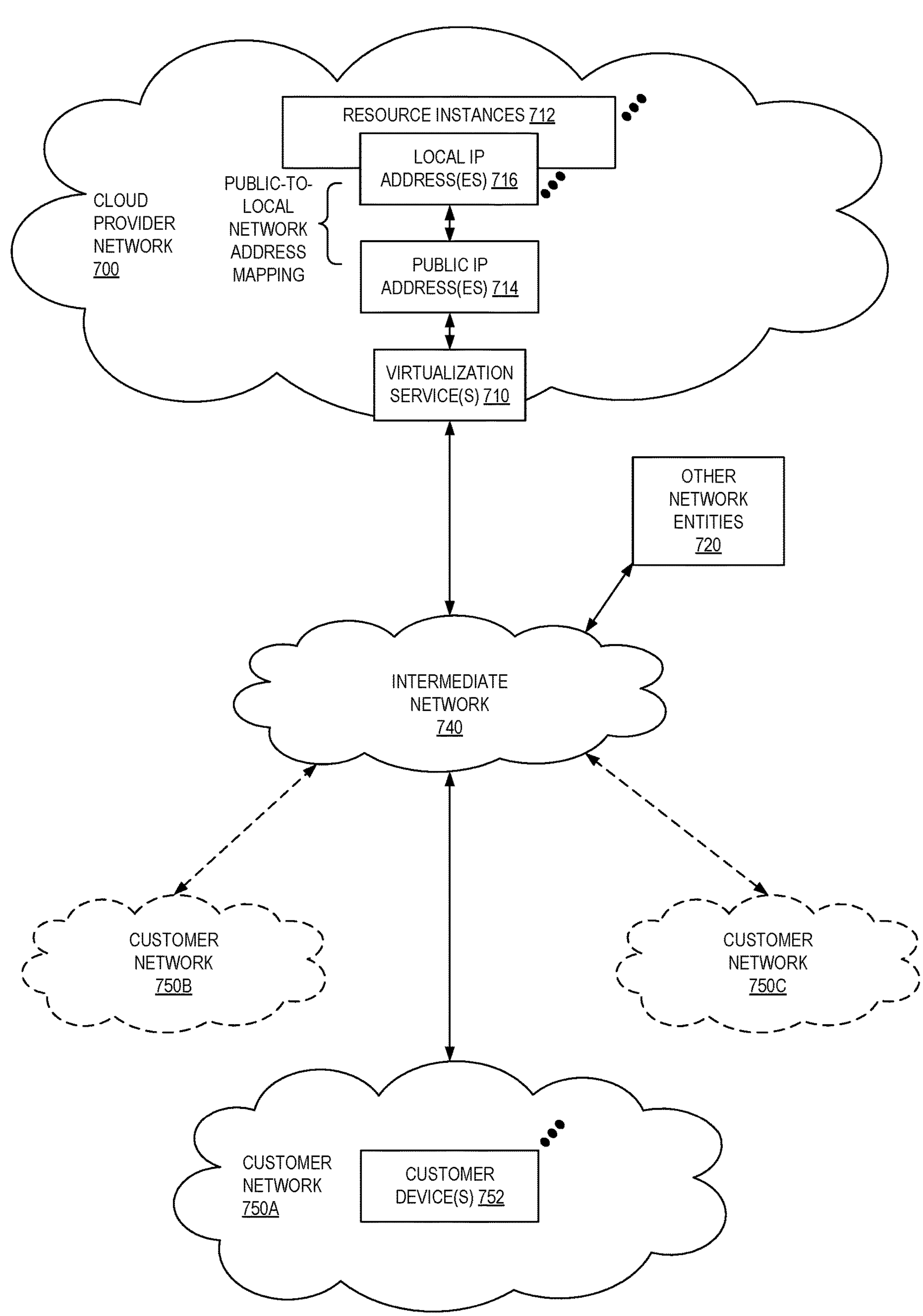
FIG. 7 illustrates an example cloud provider network environment according to some examples.

FIG. 7 illustrates an example provider network (or "service provider system") environment according to some examples. A provider network 700 can provide resource virtualization to customers via one or more virtualization services 710 that allow customers to purchase, rent, or otherwise obtain instances 712 of virtualized resources, including but not limited to computation and storage resources, implemented on devices within the provider network or networks in one or more data centers. Local Internet Protocol (IP) addresses 716 can be associated with the resource instances 712; the local IP addresses are the internal network addresses of the resource instances 712 on the provider network 700. In some examples, the provider network 700 can also provide public IP addresses 714 and/or public IP address ranges (e.g., Internet Protocol version 4 (IPv4) or Internet Protocol version 6 (IPv6) addresses) that customers can obtain from the provider 700.

Conventionally, the provider network 700, via the virtualization services 710, can allow a customer of the service provider (e.g., a customer that operates one or more customer networks 750A-750C (or "client networks") including one or more customer device(s) 752) to dynamically associate at least some public IP addresses 714 assigned or allocated to the customer with particular resource instances 712 assigned to the customer. The provider network 700 can also allow the customer to remap a public IP address 714, previously mapped to one virtualized computing resource instance 712 allocated to the customer, to another virtualized computing resource instance 712 that is also allocated to the customer. Using the virtualized computing resource instances 712 and public IP addresses 714 provided by the service provider, a customer of the service provider such as the operator of the customer network(s) 750A-750C can, for example, implement customer-specific applications and present the customer's applications on an intermediate network 740, such as the Internet. Other network entities 720 on the intermediate network 740 can then generate traffic to a destination public IP address 714 published by the customer network(s) 750A-750C; the traffic is routed to the service provider data center, and at the data center is routed, via a network substrate, to the local IP address 716 of the virtualized computing resource instance 712 currently mapped to the destination public IP address 714. Similarly, response traffic from the virtualized computing resource instance 712 can be routed via the network substrate back onto the intermediate network 740 to the source entity 720.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some examples, the mapping of a standard IP address to a local IP address of a resource instance is the default launch configuration for all resource instance types.

At least some public IP addresses can be allocated to or obtained by customers of the provider network 700; a customer can then assign their allocated public IP addresses to particular resource instances allocated to the customer. These public IP addresses can be referred to as customer public IP addresses, or simply customer IP addresses. Instead of being assigned by the provider network 700 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 8:
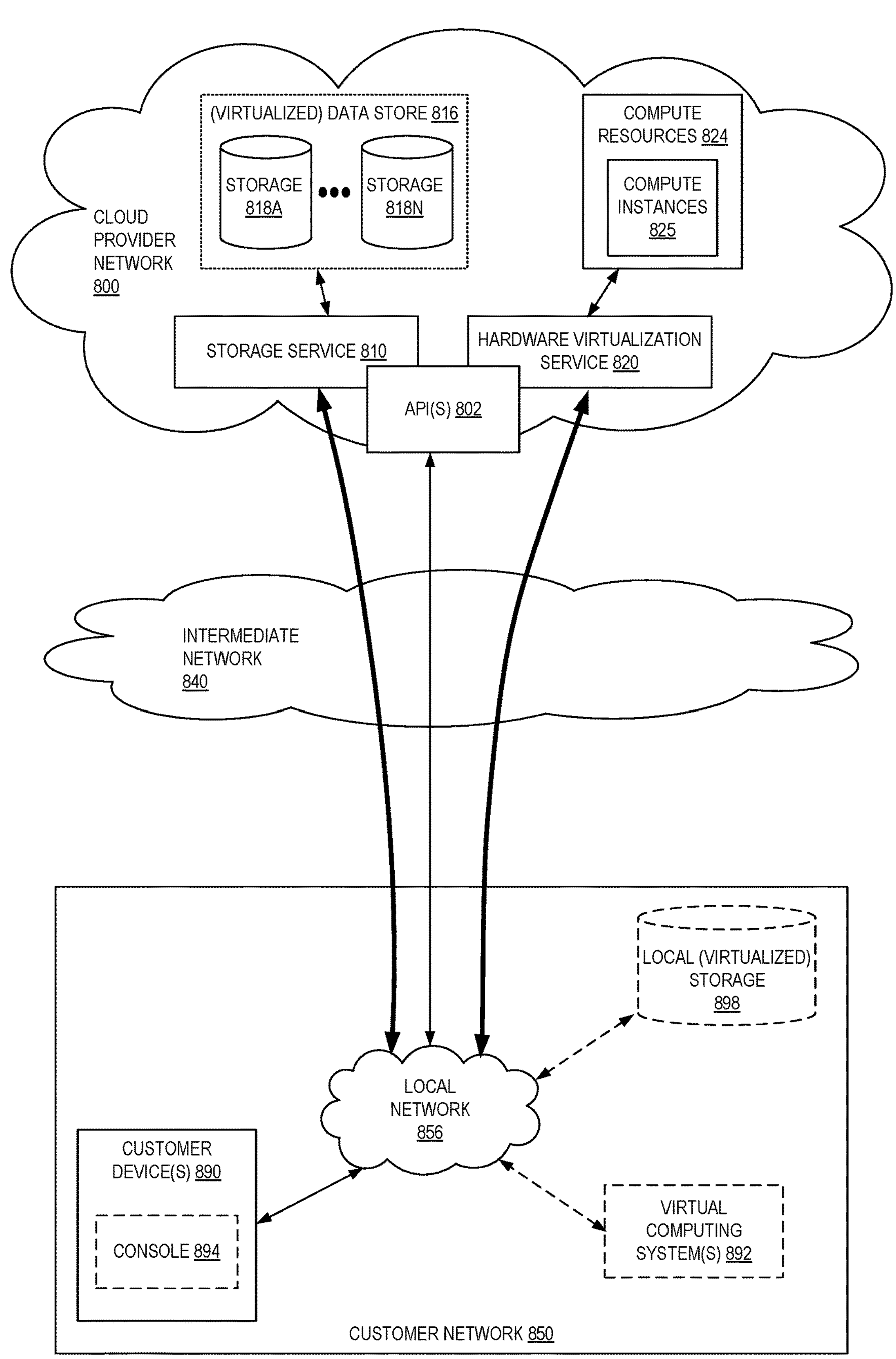
FIG. 8 is a block diagram of an example cloud provider network that provides a storage service and a hardware virtualization service to customers according to some examples.

FIG. 8 is a block diagram of an example provider network environment that provides a storage service and a hardware virtualization service to customers, according to some examples. A hardware virtualization service 820 provides multiple compute resources 824 (e.g., compute instances 825, such as VMs) to customers. The compute resources 824 can, for example, be provided as a service to customers of a provider network 800 (e.g., to a customer that implements a customer network 850). Each computation resource 824 can be provided with one or more local IP addresses. The provider network 800 can be configured to route packets from the local IP addresses of the compute resources 824 to public Internet destinations, and from public Internet sources to the local IP addresses of the compute resources 824.

The provider network 800 can provide the customer network 850, for example coupled to an intermediate network 840 via a local network 856, the ability to implement virtual computing systems 892 via the hardware virtualization service 820 coupled to the intermediate network 840 and to the provider network 800. In some examples, the hardware virtualization service 820 can provide one or more APIs 802, for example a web services interface, via which the customer network 850 can access functionality provided by the hardware virtualization service 820, for example via a console 894 (e.g., a web-based application, standalone application, mobile application, etc.) of a customer device 890. In some examples, at the provider network 800, each virtual computing system 892 at the customer network 850 can correspond to a computation resource 824 that is leased, rented, or otherwise provided to the customer network 850.

From an instance of the virtual computing system(s) 892 and/or another customer device 890 (e.g., via console 894), the customer can access the functionality of a storage service 810, for example via the one or more APIs 802, to access data from and store data to storage resources 818A-818N of a virtual data store 816 (e.g., a folder or "bucket," a virtualized volume, a database, etc.) provided by the provider network 800. In some examples, a virtualized data store gateway (not shown) can be provided at the customer network 850 that can locally cache at least some data, for example frequently accessed or critical data, and that can communicate with the storage service 810 via one or more communications channels to upload new or modified data from a local cache so that the primary store of data (the virtualized data store 816) is maintained. In some examples, a user, via the virtual computing system 892 and/or another customer device 890, can mount and access virtual data store 816 volumes via the storage service 810 acting as a storage virtualization service, and these volumes can appear to the user as local (virtualized) storage 898.

While not shown in FIG. 8, the virtualization service(s) can also be accessed from resource instances within the provider network 800 via the API(s) 802. For example, a customer, appliance service provider, or other entity can access a virtualization service from within a respective virtual network on the provider network 800 via the API(s) 802 to request allocation of one or more resource instances within the virtual network or within another virtual network.

Illustrative Systems

Figure 9:
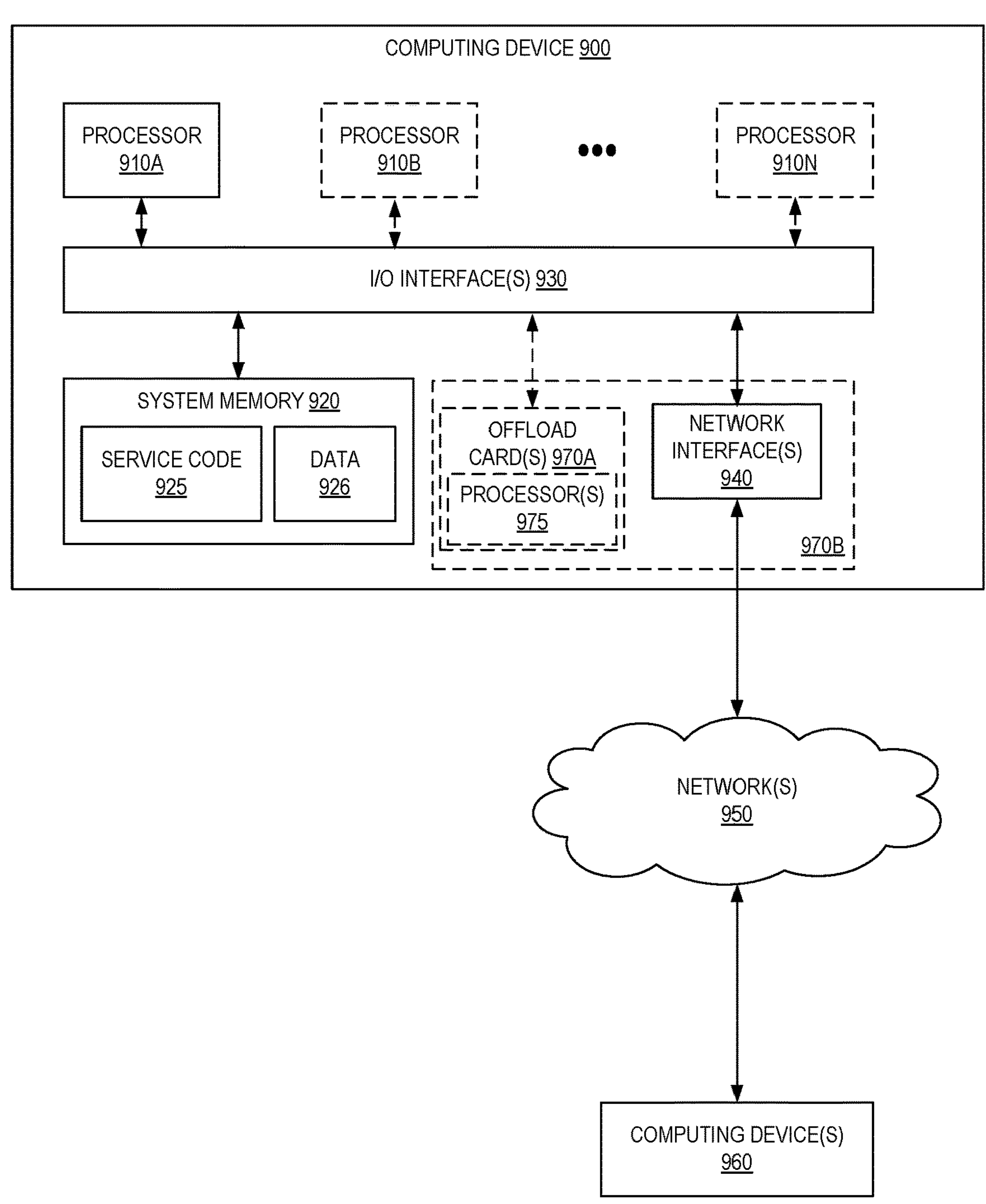
FIG. 9 is a block diagram illustrating an example computing device that can be used in some examples.

In some examples, a system that implements a portion or all of the techniques described herein can include a general-purpose computer system, such as the computing device 900 (also referred to as a computing system or electronic device) illustrated in FIG. 9, that includes, or is configured to access, one or more computer-accessible media. In the illustrated example, the computing device 900 includes one or more processors 910 coupled to a system memory 920 via an input/output (I/O) interface 930. The computing device 900 further includes a network interface 940 coupled to the I/O interface 930. While FIG. 9 shows the computing device 900 as a single computing device, in various examples the computing device 900 can include one computing device or any number of computing devices configured to work together as a single computing device 900.

In various examples, the computing device 900 can be a uniprocessor system including one processor 910, or a multiprocessor system including several processors 910 (e.g., two, four, eight, or another suitable number). The processor(s) 910 can be any suitable processor(s) capable of executing instructions. For example, in various examples, the processor(s) 910 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 910 can commonly, but not necessarily, implement the same ISA.

The system memory 920 can store instructions and data accessible by the processor(s) 910. In various examples, the system memory 920 can be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above, are shown stored within the system memory 920 as service code 925 (e.g., executable to implement, in whole or in part, the service 102) and data 926.

In some examples, the I/O interface 930 can be configured to coordinate I/O traffic between the processor 910, the system memory 920, and any peripheral devices in the device, including the network interface 940 and/or other peripheral interfaces (not shown). In some examples, the I/O interface 930 can perform any necessary protocol, timing, or other data transformations to convert data signals from one component (e.g., the system memory 920) into a format suitable for use by another component (e.g., the processor 910). In some examples, the I/O interface 930 can include support for devices attached through various types of peripheral buses, such as a variant of the Peripheral Component Interconnect (PCI) bus standard or the Universal Serial Bus (USB) standard, for example. In some examples, the function of the I/O interface 930 can be split into two or more separate components, such as a north bridge and a south bridge, for example. Also, in some examples, some or all of the functionality of the I/O interface 930, such as an interface to the system memory 920, can be incorporated directly into the processor 910.

The network interface 940 can be configured to allow data to be exchanged between the computing device 900 and other computing devices 960 attached to a network or networks 950, such as other computer systems or devices as illustrated in FIG. 1, for example. In various examples, the network interface 940 can support communication via any suitable wired or wireless general data networks, such as types of Ethernet network, for example. Additionally, the network interface 940 can support communication via telecommunications/telephony networks, such as analog voice networks or digital fiber communications networks, via storage area networks (SANs), such as Fibre Channel SANs, and/or via any other suitable type of network and/or protocol.

In some examples, the computing device 900 includes one or more offload cards 970A or 970B (including one or more processors 975, and possibly including the one or more network interfaces 940) that are connected using the I/O interface 930 (e.g., a bus implementing a version of the Peripheral Component Interconnect-Express (PCI-E) standard, or another interconnect such as a QuickPath interconnect (QPI) or UltraPath interconnect (UPI)). For example, in some examples the computing device 900 can act as a host electronic device (e.g., operating as part of a hardware virtualization service) that hosts compute resources such as compute instances, and the one or more offload cards 970A or 970B execute a virtualization manager that can manage compute instances that execute on the host electronic device. As an example, in some examples the offload card(s) 970A or 970B can perform compute instance management operations, such as pausing and/or un-pausing compute instances, launching and/or terminating compute instances, performing memory transfer/copying operations, etc. These management operations can, in some examples, be performed by the offload card(s) 970A or 970B in coordination with a hypervisor (e.g., upon a request from a hypervisor) that is executed by the other processors 910A-910N of the computing device 900. However, in some examples the virtualization manager implemented by the offload card(s) 970A or 970B can accommodate requests from other entities (e.g., from compute instances themselves), and can not coordinate with (or service) any separate hypervisor.

In some examples, the system memory 920 can be one example of a computer-accessible medium configured to store program instructions and data as described above. However, in other examples, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computing device 900 via the I/O interface 930. A non-transitory computer-accessible storage medium can also include any volatile or non-volatile media such as RAM (e.g., SDRAM, double data rate (DDR) SDRAM, SRAM, etc.), read only memory (ROM), etc., that can be included in some examples of the computing device 900 as the system memory 920 or another type of memory. Further, a computer-accessible medium can include transmission media or signals such as electrical, electromagnetic, or digital signals, conveyed via a communication medium such as a network and/or a wireless link, such as can be implemented via the network interface 940.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most examples use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C#or C++, or any scripting language, such as Perl, Python, PHP, or TCL, as well as combinations thereof. The server(s) can also include database servers, including without limitation those commercially available from Oracle®, Microsoft®, Sybase®, IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate examples can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth in order to provide a thorough understanding of the examples. However, it will also be apparent to one skilled in the art that the examples can be practiced without the specific details. Furthermore, well-known features can be omitted or simplified in order not to obscure the example being described.

Bracketed text and blocks with dashed borders (e.g., large dashes, small dashes, dot-dash, and dots) are used herein to illustrate optional aspects that add additional features to some examples. However, such notation should not be taken to mean that these are the only options or optional operations, and/or that blocks with solid borders are not optional in certain examples.

Reference numerals with suffix letters (e.g., 818A-818N) can be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various examples.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given example requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated. Similarly, the values of such numeric labels are generally not used to indicate a required amount of a particular noun in the claims recited herein, and thus a "fifth" element generally does not imply the existence of four other elements unless those elements are explicitly included in the claim or it is otherwise made abundantly clear that they exist.

The specification and drawings are, accordingly, to be regarded in an illustrative rather than a restrictive sense. It will, however, be evident that various modifications and changes can be made thereunto without departing from the broader scope of the disclosure as set forth in the claims.

What is claimed is:

1. A computer-implemented method comprising:

receiving a request to perform a malware scan of a filesystem utilized by a first compute instance associated with a user within a cloud provider network;

creating a snapshot of a first logical storage volume attached to the first compute instance associated with the user, wherein the first logical storage volume stores the filesystem;

attaching a second logical storage volume, generated based on use of the snapshot, to a second compute instance according to a first connection type, wherein the second compute instance is executed by a computing device, wherein the second logical storage volume is a network-attached volume provided by a block storage service of the cloud provider network, and wherein upon the attachment, data of the second logical storage volume is not present on the computing device;

initiating a pre-warming phase to pre-warm the second logical storage volume, the pre-warming phase comprising sending network requests to the block storage service to perform sequential block-level reads of the second logical storage volume;

in response to a completion of the pre-warming phase, modifying an attachment of the second logical storage volume to the second compute instance from the first connection type to a second connection type, the second connection type providing a comparatively lower performance amount than the first connection type, wherein the performance amount is an amount of input-output operations per second (IOPS); and after the modifying of the attachment, executing the malware scan utilizing the second logical storage volume.

2. The computer-implemented method of claim 1, wherein modifying the attachment of the second logical storage volume to the compute instance from the first connection type to the second connection type comprises transmitting, via use of a network interface, a command to the block storage service of the cloud provider network to change a volume type of the second logical storage volume.

3. The computer-implemented method of claim 1, wherein the pre-warming phase encompasses reading an entirety of the second logical storage volume, and wherein the modifying of the attachment occurs after reading the entirety of the second logical storage volume.

4. A computer-implemented method comprising:

attaching a logical storage volume to a compute instance, executed by a computing device, according to a first connection type;

initiating a pre-warming phase to pre-warm the logical storage volume, the pre-warming phase comprising performing sequential block-level reads of the logical storage volume;

completing the pre-warming phase;

in response to the completion of the pre-warming phase, modifying an attachment of the logical storage volume to the compute instance from the first connection type to a second connection type, the second connection type providing a comparatively lower performance amount than the first connection type; and executing a task, by the compute instance, via use of the logical storage volume.

5. The computer-implemented method of claim 4, wherein performing the sequential block-level reads includes:

transmitting one or more requests, via a network interface of the computing device, to read one or more blocks of data associated with the logical storage volume;

receiving, via the network interface, the one or more blocks of data; and storing the one or more blocks in a memory of the computing device.

6. The computer-implemented method of claim 4, wherein the first connection type provides a comparatively larger amount performance amount than the second connection type by at least providing a larger amount of input-output operations per unit time than the second connection type.

7. The computer-implemented method of claim 4, wherein the pre-warming phase for the logical storage volume comprises issuing a plurality of reads of sectors or blocks of the logical storage volume in a sequential manner starting at a beginning of the logical storage volume.

8. The computer-implemented method of claim 7, wherein the plurality of reads encompasses reading an entirety of the logical storage volume, and wherein the modifying of the attachment occurs after reading the entirety of the logical storage volume.

9. The computer-implemented method of claim 4, wherein executing the task comprises performing a malware scan of a filesystem provided by the logical storage volume.

10. The computer-implemented method of claim 9, further comprising:

generating a snapshot of a user volume utilized by a user compute instance within a cloud provider network, wherein the attaching of the logical storage volume is based on use of the snapshot, and wherein the malware scan includes scanning files of the filesystem.

11. The computer-implemented method of claim 4, wherein modifying the attachment of the logical storage volume to the compute instance from the first connection type to the second connection type comprises transmitting, via use of a network interface, a command to a storage service of a cloud provider network to change a volume type of the logical storage volume.

12. The computer-implemented method of claim 4, further comprising:

obtaining volume usage metadata indicative of usage characteristics of the logical storage volume, wherein the pre-warming phase occurs based at least in part on an analysis of the volume usage metadata.

13. The computer-implemented method of claim 4, wherein the logical storage volume is managed by a storage service of a cloud provider network, and wherein the compute instance is executed by a computing device managed by a hardware virtualization service of the cloud provider network, and wherein the logical storage volume is a network-connected block storage volume provided by the storage service.

14. The computer-implemented method of claim 4, wherein the pre-warming phase does not retrieve the entirety of the logical storage volume, and wherein the executing of the task includes issuing network requests to retrieve additional sectors or blocks of the logical storage volume, based on file-level reads, via use of the logical storage volume according to the second attachment type.

15. A system comprising:

a first one or more computing devices to implement a block storage service in a multi-tenant provider network; and a second one or more computing devices to implement a malware protection service in the multi-tenant provider network, the malware protection service including instructions that upon execution cause the malware protection service to:

attach a logical storage volume to a compute instance according to a first connection type, wherein the logical storage volume is a network-attached volume provided by the block storage service, wherein the compute instance is executed by a computing device;

initiate a pre-warming phase to pre-warm the logical storage volume via performing sequential block-level reads of the logical storage volume;

in response to a completion of the pre-warming phase, send a request to the block storage service to modify an attachment of the logical storage volume to the compute instance from the first connection type to a second connection type, the second connection type providing a comparatively lower performance amount than the first connection type; and execute a task, by the compute instance, via use of the logical storage volume.

16. The system of claim 15, wherein the malware protection service further includes instructions that upon execution cause the malware protection service to perform the sequential block-level reads by:

transmitting one or more requests, via a network interface to the block storage service, to read one or more blocks of data associated with the logical storage volume;

receiving, via the network interface, the one or more blocks of data; and storing the one or more blocks in a memory of the computing device.

17. The system of claim 15, wherein the first connection type provides a comparatively larger amount performance amount than the second connection type by at least providing a larger amount of input-output operations per unit time than the second connection type.

18. The system of claim 15, wherein the malware protection service further includes instructions that upon execution cause the malware protection service, as part of the pre-warming phase, to pre-warm the logical storage volume by:

issuing a plurality of reads of sectors or blocks of the logical storage volume in a sequential manner starting at a beginning of the logical storage volume.

19. The system of claim 18, wherein the plurality of reads encompasses reading an entirety of the logical storage volume, and wherein the modifying of the attachment occurs after reading the entirety of the logical storage volume.

20. The system of claim 15, wherein the executing of the task comprises performing a malware scan of a filesystem provided by the logical storage volume.

* * * * *